United States Patent

[11] 3,593,023

| [72] | Inventors | Michael Dodson<br>Fullerton;<br>Raymond J. Gomez, Arcadia, both of, Calif. |
|---|---|---|
| [21] | Appl. No. | 814,509 |
| [22] | Filed | Mar. 27, 1969 |
| [45] | Patented | July 13, 1971 |
| [73] | Assignee | Beckman Instruments, Inc.<br>Continuation-in-part of application Ser. No. 767,903, Sept. 18, 1968, now abandoned. |

[54] APPARATUS AND METHOD FOR EXHAUST ANALYSIS
35 Claims, 3 Drawing Figs.

[52] U.S. Cl. .................................................... 250/43.5,
23/232, 23/254, 73/23, 73/421.5
[51] Int. Cl. ................................................. G01n 21/26,
G01n 31/00
[50] Field of Search.......................................... 73/23,
421.5; 250/41.9 S, 43.5; 23/232, 254

[56] References Cited
UNITED STATES PATENTS

| 1,658,391 | 2/1928 | Potter | 73/23 |
|---|---|---|---|
| 2,824,967 | 2/1958 | Kamen | 250/41.9 (S) |
| 3,296,435 | 1/1967 | Teal et al. | 250/43.5 |
| 3,461,727 | 8/1969 | Everhard et al. | 73/421.5 |
| 3,472,067 | 10/1969 | Chew | 73/421.5 X |
| 3,481,200 | 12/1969 | Ludecke et al. | 73/421.5 |

FOREIGN PATENTS

| 1,045,004 | 10/1966 | Great Britain | 73/421.5 |

*Primary Examiner*—James W. Lawrence
*Assistant Examiner*—A. L. Birch
*Attorneys*—Robert J. Steinmeyer and William F. McDonald ABSTRACT: An apparatus and method for determining the content of certain constituents in hot gases, such as the exhaust of motor vehicles or the like. The exhaust gas is conveyed by a pump to an air cooled condenser to lower the temperature of the gas to essentially ambient temperature and thus condense water vapor therein. The gas is then heated to a temperature above said ambient temperature while being conveyed from the condenser through a conduit to a sample cell of a radiant energy analyzer so that water vapor in the gas passing through the conduit and cell will not condense upon the walls thereof. The cell is positioned above a water trap in the condenser a distance sufficiently great so that no water in the trap will be carried into the cell by the flow of gas passing through the apparatus. The gas is preferably conveyed through the apparatus by means of a jet pump connected to an outlet port on the cell. The jet pump embodies a restriction at its outer end to provide automatic pressure regulation in the apparatus so that the gas pressure in the sample cell will remain relatively constant regardless of pressure fluctuations in the air supply that drives the pump.

FIG. 1

INVENTORS
MICHAEL DODSON
BY RAYMOND J. GOMEZ

BY Thomas L. Peterson

ATTORNEY

INVENTORS
MICHAEL DODSON
RAYMOND J. GOMEZ

BY
ATTORNEY

APPARATUS AND METHOD FOR EXHAUST ANALYSIS

CROSS-REFERENCE TO RELATED APPLICATION

This application is a continuation-in-part of our copending application entitled "Automobile Exhaust Analysis System" Ser. No. 767,903, filed Sept. 18, 1968, now abandoned assigned to the assignee of the present application.

BACKGROUND OF THE INVENTION

The present invention relates to an apparatus and method for gas analysis and, more specifically, to an apparatus and method for analyzing particular constituents in the exhaust gas of internal combustion engines such as utilized in motor vehicles.

The analysis of exhaust gas is important for two reasons. One is that certain constituents in exhaust gases contribute considerably to the pollution of air. A common one of these constituents is carbon monoxide. Thus, for air pollution control purposes, it is desirable to have means for analyzing exhaust gases for their carbon monoxide content. In addition, the determination of the carbon monoxide content of exhaust gases provides a means for ascertaining whether or not maximum combustion of fuel is being achieved in an internal combustion engine. Hence, by determining the carbon monoxide content of the exhaust gas of such an engine, one can determine whether or not the engine is properly tuned for efficient performance.

In view of the foregoing, there has been a rising demand for a low cost and accurate apparatus and method for analyzing exhaust gases of motor vehicles for their carbon monoxide content. It will be appreciated, however, from the following description that the invention and its advantages are not limited to the analysis of motor vehicle exhaust gases for their carbon monoxide content, but are also applicable to the determination of other constituents in such gases and to the analysis of gases from any source.

A common means for analyzing exhaust gases is a radiant energy analyzer, such as a nondispersive infrared analyzer, that basically comprises a radiant energy source and a detector which are placed on opposite sides of a sample cell through which the exhaust flows. Since a radiant energy analyzer operates on the principle of absorption of radiation by the constituent being determined in the test gas, it is important that solid and liquid water be removed from the gas so that these materials will not deposit upon the windows of the sample cell, thus reducing transmittance of radiant energy through the sample and, hence, creating an "apparent" absorption. A common mode of removing particulate matter and water from exhaust gas is by passing the gas through a suitable filter and ice-cooled condenser. The use of such a condenser, however, requires a suitable receptacle for the ice, a considerable amount of insulation material for the condenser, as well as continual maintenance to ensure that sufficient ice is available to ensure that all water is removed from the sample gas. These factors all add substantially to the cost of manufacture and maintenance of the analysis apparatus. Thus, it would be desirable to have an exhaust analysis apparatus which is capable of effectively removing interferring materials from the test gas, yet does not require the expensive and maintenance demanding features of the aforementioned presently available gas analysis apparatus.

The absorption of radiation by the sample gas is also dependent upon the density of the gas within the sample cell. The density of the gas is a function of the pressure of the gas within the cell, and the pressure is in turn related to the rate of flow of gas passing through the sampling system. It can therefore be appreciated that some means is required for closely regulating the flow rate of gas passing through an exhaust analysis apparatus employing a radiant energy analyzer so that the density of the gas in the sample cell will remain relatively constant. Otherwise, substantial variations in the output of the analyzer will result even though there is no change in the carbon monoxide content of the gas being analyzed.

Summary of the Invention

The principal object of the present invention is to provide a simple and inexpensive method and apparatus for analyzing exhaust gases.

According to one of the principal features of the present invention, there is provided a method and apparatus for exhaust gas analysis in which the exhaust gas is initially cooled to essentially ambient temperature to condense the majority of water vapor therein. Thereafter, the gas is heated to a temperature above said ambient temperature while being conveyed through a conduit and the sample cell of a gas analyzer. Hence, no water vapor in the gas passing through the conduit or cell will condense upon the walls thereof and thus interfere in the analysis of the gas. Therefore, by this arrangement the commonly utilized ice cooled condenser is eliminated, thus substantially lowering the cost of the apparatus and avoiding the ice maintenance problem of the prior exhaust analyzers.

According to another feature of the invention, the sample cell of the gas analyzer is positioned above the water trap in the condenser utilized to cool the sample gas. The pump utilized for conveying the gas through the apparatus produces a flow of gas sufficiently low, and the cell is sufficiently high above the water trap in the condenser, so that the force produced by the pump is incapable of drawing condensate from the trap into the sample cell. Thus, interference in the analysis of the sample gas due to water collected in the trap being carried into the sample cell is eliminated in a simple and inexpensive manner.

According to still a further aspect of the invention, the pump utilized for conveying gas through the apparatus is preferably a jet pump connected to an outlet port on the gas sample cell. This pump is driven by the air supply available in conventional automobile or garage shops and, therefore, requires no special source of power not readily available in those locations. An important feature of the pump is the provision of a restriction at its outlet end so that automatic pressure regulation of the gas flowing through the apparatus is achieved, thus minimizing any errors in the analysis of the gas which might otherwise occur due to pressure fluctuations which are normally encountered in garage shops air supplies.

Other objects, aspects and advantages of the invention will become apparent from the following description taken in connection with the accompanying drawings.

DESCRIPTION OF THE PREFERRED EMBODIMENTS

Figure 1:
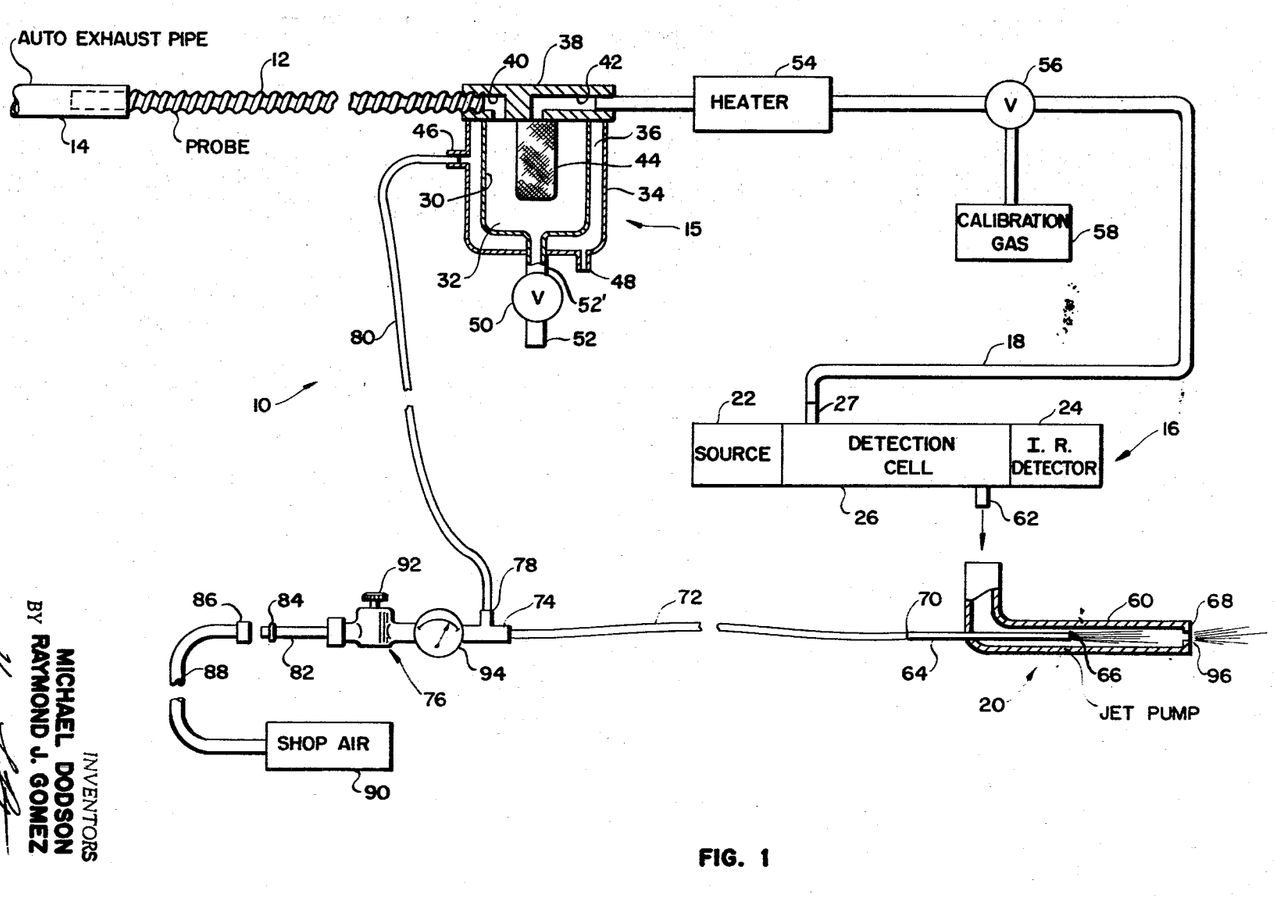
FIG. 1 is a schematic view of the preferred form of the exhaust analysis apparatus embodying the features of the present invention.
Figure 3:
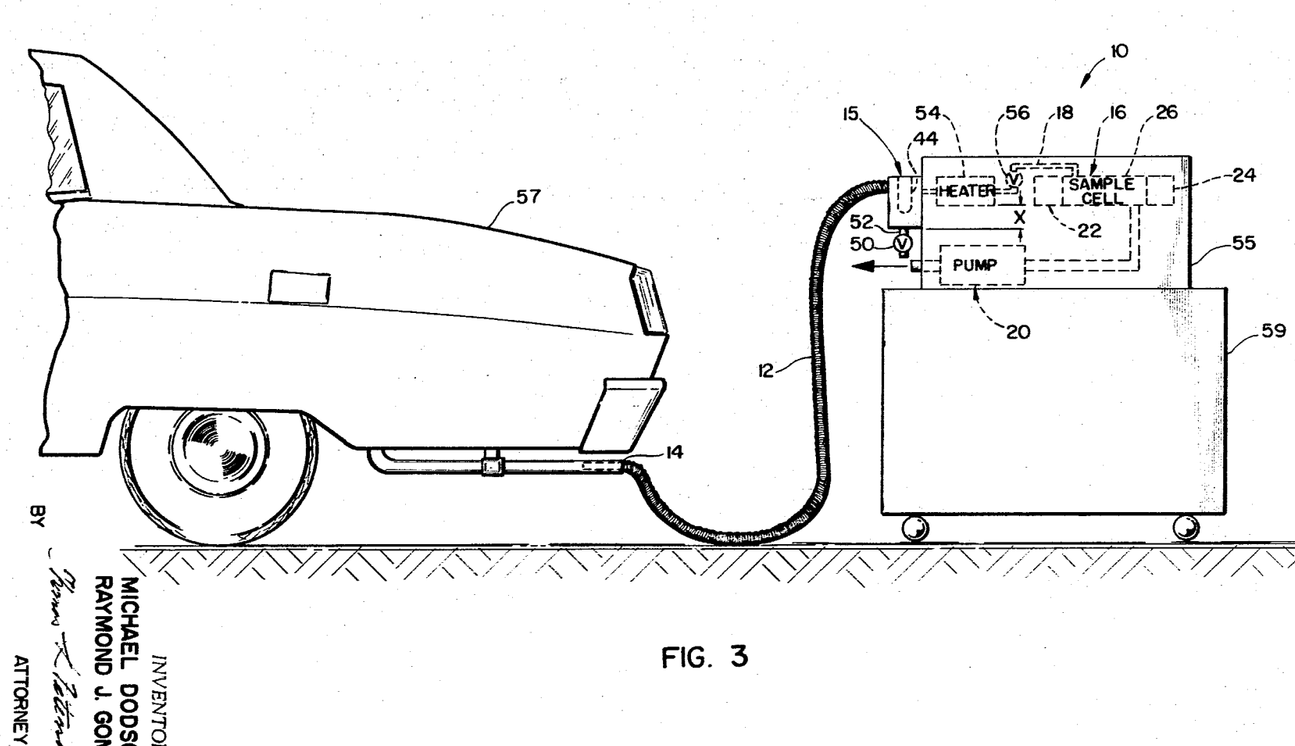
FIG. 3 is a somewhat diagrammatic side elevational view of the apparatus illustrated in FIG. 1 shown as it would be utilized in actual practice in analyzing the exhaust of an automobile.

Referring now to the drawings in detail, there is illustrated in FIG. 1 a preferred form of the gas analysis apparatus of the present invention, generally designated 10. FIG. 1 is a schematic layout of the apparatus only and is not intended to represent the spacial relationship of the various components. FIG. 3 is illustrative of the spacial relationship of the various components. Basically the apparatus comprises a sampling probe 12 for insertion into the end of an exhaust pipe 14, a condenser and filter assembly 15, a gas analyzer 16, a conduit 18 connecting the assembly 15 to the analyzer, and a pump 20 for drawing exhaust from the pipe 14 through the probe 12, assembly 15, conduit 18 and analyzer 16.

It is preferred that the analyzer 16 be of the radiant energy type, such as a nondispersive infrared analyzer that includes a source of radiation 22 and an IR detector 24 positioned on opposite sides of a sample cell or chamber 26 through which the exhaust gas passes. For an inexpensive analyzer, it is preferred that the detector be of the type known in the art as a thermistor bolometer. As above mentioned, it is important in the operation of a radiant energy analyzer that the sample gas be free of solid matter and liquid which might deposit on the windows, not shown, of the sample cell adjacent to the radiation source and IR detector. The apparatus 10 embodies several features which ensure that solid matter and liquid in the sample gas will not reach the cell 26, and that water vapor will not become condensed upon the walls of the cell, yet without the requirement of an ice-cooled condenser which would add considerably to the cost and maintenance of the apparatus.

One of the aforementioned features is the provision in the apparatus of an air cooled condenser and means for heating the gas flowing from the condenser to the cell 26. More specifically, the probe 12 is preferably in the form of an elongated flexible corrugated metal tubing which, by virtue of its large surface area exposed to the surrounding ambient air, provides a precooling of the exhaust gas passing therethrough.

The condenser and filter assembly 15 is connected between the sampling probe 12 and one end of conduit 18, the other end of the conduit being connected to an inlet port 27 on the sample cell 26. This assembly includes an inner container 30 providing an inner chamber 32 and an outer container 34 spaced from the inner container so as to provide therebetween an outer chamber 36. A cap 38 closes both the chambers. Inlet and outlet passages 40 and 42, respectively, are provided in the cap for permitting flow of exhaust gas from the probe 12 into the inner chamber 32 and outwardly into the conduit 18. A hollow filter element 44 is positioned in the inner chamber and surrounds the outlet passage 42 for removing any solid particles from the sample gas. The wall of the container 30 is cooled to condense water vapor in the exhaust gas by means of air which is supplied to the outer chamber 36 via an inlet 46 and exits therefrom via an outlet 48. A valve 50 is provided in an outlet 52 of the inner chamber 32. The portion of the outlet 52 above the valve provides a trap 52' in which condensate will collect and the valve permits withdrawal of such condensate from the trap.

If the pipe 14 is the exhaust pipe of an automobile, normally the temperature of the gas exiting therefrom will be near 300° F. at idle condition of the engine. At high speed or full load of the engine, the temperature of the exhaust will be about 900° F. It can be appreciated that when the hot exhaust gas is initially drawn through the apparatus 10 by pump 20, the gas is precooled in the probe 12 before reaching the condenser and filter assembly 15. Preferably the probe 12 is sufficiently long so that the temperature of the gas passing therethrough will approach ambient temperature when the gas enters assembly 15. The air cooled condenser in assembly 15 ensures that the temperature of the gas passing therethrough will be reduced to essentially ambient temperature so that the majority of the water vapor in the gas will condense upon the wall 30 of the condenser and be collected in the trap 52'. Exhaust gas at room or ambient temperature, i.e., at about 70° F., will contain about 2.5 percent water in the vapor state. Thus, if the gas emanating from the assembly 15 were conveyed directly to the cell 26 without further conditioning, the water vapor remaining in the gas might condense upon the walls of the conduit 18 and the cell. To prevent such condensation from occurring, it is necessary to provide means to ensure that the temperature of the gas passing through conduit 18 and cell 26 does not drop below the temperature of the gas at the condenser, i.e., ambient temperature. To this end, the gas passing through the conduit 18 and cell 26 is heated to a temperature above ambient temperature. Preferably, the gas flowing through conduit 18 and cell 26 is heated to a temperature about 10°—20° F. above ambient to prevent condensation yet not affect the performance of the analyzer 18. To heat the gas in conduit 18 to such elevated temperature, a heater 54 is provided downstream of the assembly 15. The heat radiating from the source 22, the electrical circuitry, not shown, associated with the source and detector 24, and from the pump 20, is sufficient to maintain the temperature of gas in cell 26 at the desired level. The heater 54 could be eliminated if the conduit 18 were enclosed within a housing, such as shown at 55 in FIG. 3 of the drawings, in heat transfer relationship with the source 22, detector 24, associated circuitry and pump 20.

A valve 56 is included in the conduit 18 so that, when desired, a calibration gas from a source 58 may be conveyed into the sample cell 26 by the conduit 18 for calibration of the analyzer 16.

Referring now to FIG. 3 in detail, the apparatus 10 is illustrated as it normally would be utilized in connection with the analysis of the exhaust of an automobile 57. As seen, the housing 55 of the apparatus 10 is positioned on top of a cart 59, with the inlet end of the probe 12 inserted into the exhaust pipe 14. An intermediate section of the corrugated probe will normally lie upon the floor as shown. The analyzer 16 including the sample cell 26, conduit 18, pump 20, heater 54 and valve 56 are positioned within the housing 55. The heater 54 could be eliminated as discussed above. Preferably the filter and condenser assembly 15 is mounted outside of the housing and is separated therefrom by an insulated wall, not shown.

Another important feature of the invention is the mounting of the sample cell 26 above the water trap 52' of assembly 15, and above any traps which would be formed in the probe 12 lying on the floor, a distance sufficient so that the suction produced by the pump 20 is incapable of drawing condensate from either the probe 12 or trap 52' through the conduit 18 into the sample cell. In order that the analyzer 16 will have a response time of no more than about 5 seconds, for example, the pump 20 must create a flow rate through the apparatus 10 of about 0.2 to 2 cubic feet per minute. This will establish a pressure or partial vacuum in the cell 26 of about 4 inches of water below atmospheric pressure. Preferably this pressure should be maintained within a range of about 3.5 to 4.5 inches of water below atmosphere so that errors in the output signal of the detector 24 will not exceed 1 percent. Thus, if the pump 20 produces a pressure of 4 inches of water below atmospheric in the cell 26, for example, the cell should be positioned a distance (indicated by the symbol X in FIG. 3) above the trap 52' and the lowermost portion of the probe 12 greater than 4 inches. In other words, the distance between the bottom of the cell 16 and the top of the trap 52' should be greater than the number of inches of water below atmosphere of the pressure in the cell.

Another advantage of the invention is that the exhaust gas passes through the apparatus at a relatively low flow rate. Thus, if by chance any grease, dirt, or the like collects on the walls of the gas conducting portions of the apparatus, it is highly unlikely that any such material will become dislodged from such walls and be carried into the cell 26. Moreover, if such material collecting on the walls of the conduits tends to restrict the passage of gas therethrough, the affect thereof upon the output of the analyzer 16 would not be nearly so significant as would be the case if flow rate of gas passing through the apparatus were substantially higher.

It is to be understood that various forms of pumps could be utilized for conveying the sample gas through the apparatus 10. For example, a mechanical pump such as a rotary, diaphragm or centrifugal pump, could be utilized. Such a pump would preferably be mounted in the conduit 18 adjacent to the cell inlet port 27 so that a pressure regulator could be mounted at the outlet port 62 of the cell 26 for controlling the flow of gas and therefore the pressure within the cell.

Another form of pump which may be utilized in the apparatus 10 is an aspirator. The aspirator would preferably be connected to the outlet 62 to the cell since if it were mounted in the conduit 18 the air supply for driving the aspirator would dilute the gas entering the sample cell. An aspirator would have the advantage over a mechanical pump in that it is less expensive. In addition, since the aspirator pump could be connected to the outlet port 62 of the cell, its outlet end would open directly to atmosphere, and, hence, its performance would not be affected by flow restrictions downstream thereof as would the performance of a mechanical pump mounted in conduit 18 upstream of the cell 26.

In the preferred form of the invention, the pump 20 is a jet pump which is connected to the outlet 62 of the sample cell. A jet pump has the same advantages over a mechanical pump as does an aspirator, and the advantage over an aspirator in that it requires a relatively smaller driving fluid flow rate and in addition will move relatively larger volumes of sample gas. As best seen in FIG. 1, the jet pump consists of an outer tube 60 coupled to the outlet port 62 of the cell 26 and an inner tube 64. The pump is shown enlarged as compared to the cell 26 and outlet 62 for purposes of clarity. As can be seen, the inner tube 64 is of a substantially smaller diameter than the outer tube 60 and it passes through the wall of the outer tube with its inner end 66 spaced from the outlet end 68 of the outer tube. The outer end 70 of the inner tube is connected by a hose 72 to an outlet 74 of a valve assembly 76. The assembly 76 includes a second outlet 78 which is connected via a hose 80 to the inlet 46 of the condenser and filter assembly 15. The valve assembly 76 includes an inlet end 82 which is provided with a quick disconnect fitting or coupling 84. This coupling is adapted to be rapidly connected to a mating coupling 86 on the end of a conventional shop air hose 88 of the type normally found in automobile shops or garages for driving pneumatic tools or the like. A compressor is normally provided in such garages of shops for producing a source of pressurized shop air, which is indicated at 90 and to which the hose 88 is connected.

The valve assembly 76 further includes a valve element 92 which controls the flow of shop air from the inlet 82 to the outlets 74 and 78. A pressure gauge 94 in the assembly 76 provides a visual indication of the pressure of the gas passing through the assembly. Normally a shop air supply is at a pressure of about 30 to 100 p.s.i.g. However, for exhaust analysis applications the jet pump may be operated at a lesser pressure. The valve element 92 provides means for dropping the pressure of the air entering the assembly 76 to the desired level.

The air passing through the assembly 76 is conveyed through hose 80 to the condenser assembly 15 where it serves as the cooling medium for the condenser, and through hose 72 to the inner tube 64 of the jet pump to serve as the pump driving medium. The air introduced into the tube 64 exits from its orifice 66 in the form of a small high velocity jet in the center of the outer tube 60. Such high velocity jet transfers momentum to the gas in the outer tube and therefore creates a pumping action or pressure differential across the opposite ends of the tube 60 thereby drawing auto exhaust through the apparatus for analysis in the sample cell 26. It can be readily appreciated that the jet pump 20 is extremely simple and inexpensive, requires no moving parts, and is driven by a readily available source of fluid pressure, namely, the supply of pressurized air found in conventional automobile garages. Of course, other sources of pressurized gas could be utilized for driving the pump 20 if desired.

As previously explained, in order to minimize errors in the output of the analyzer 16, it is required that the pressure in the sample cell 26 remain virtually constant. Preferably, the pressure in the cell should not vary more than 1 percent of atmospheric pressure. However, the pressure of the shop air supply which drives the pump 20 may vary as much as 200 percent. As a consequence, pressure variations of considerable magnitude will occur in the cell 26. In order to maintain the cell pressure constant, it can be appreciated that the rate of flow of gas passing therethrough must be maintained constant. In addition, a constant flow rate is required to avoid variations in the response time of analyzer 16. In view of the foregoing, some means is required for providing pressure regulation in the apparatus 10.

When the desired exhaust flow rates are between about 0.2 and 2 cubic feet per minute as indicated above so that a response time of no more than 5 seconds is achieved by the analyzer 16, the valve element 92 of the assembly 76 is set so that the pressure of air passing into the tube 64 of the jet pump is in the range of about 10 to 25 p.s.i.g. This will establish a pressure or partial vacuum in the detector cell 26 of about 4 inches of water below atmospheric pressure. Since shop air supplies are not always provided with pressure regulators, and the addition of regulators thereto would add substantially to the cost of the apparatus, it would be desirable to provide in the apparatus 10 an inexpensive means for regulating the pressure differential created by the jet pump 20 and hence, the sample pressure in cell 26.

In accordance with another important feature of the invention, sample pressure regulation is achieved by providing a restriction 96 in the outlet end 68 of the jet pump. The restriction 96 minimizes the affect of pressure fluctuations in the air source 90 on the output and response time of the analyzer 16. This can be appreciated from the fact that if the pressure in the air delivered to the inner tube 64 of the jet pump increases, the increased flow of the jet emanating from the end 66 of tube 64 creates a buildup of pressure at the restriction 96 and therefore reduces the pumping efficiency of the jet pump. Likewise, a reduction in shop air pressure decreases the pressure at the restriction 96 and the pumping efficiency is increased. By appropriately selecting the inner diameter of the outer tube 60, the diameter of the nozzle end 66 of the inner tube 64, and the diameter of the restriction 96, as well as the relative position of the end 66 and outlet end 68 of the inner and outer tubes respectively, the pressure drop in the jet pump and thus the flow rate of gas through the apparatus may be held relatively constant over a relatively wide variation of shop air pressures. Thus, the restriction 96 in the end of the jet pump provides sample pressure regulation without the requirement of a separate and expensive regulator on the shop air supply 90.

Figure 2:
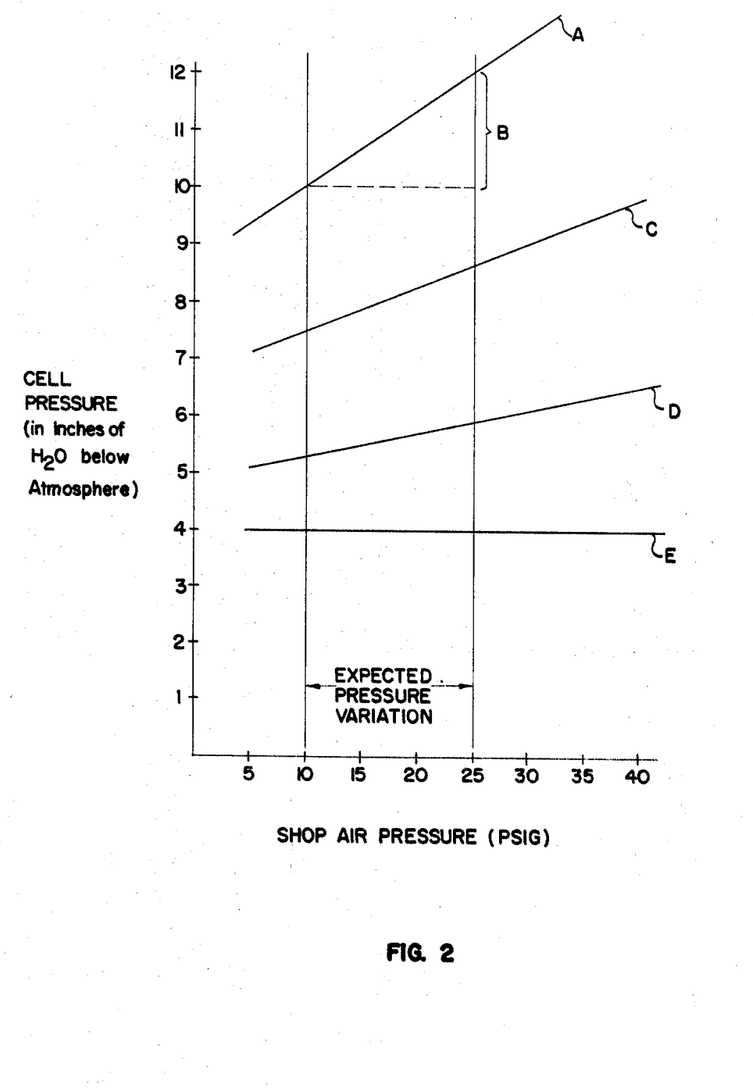
FIG. 2 is a graph illustrating several performance curves for the apparatus illustrated in FIG. 1.

The importance of pressure regulation and the advantageous results achieved by the restriction 96 will be appreciated by making reference to FIG. 2 which illustrates four performance curves on a graph the abscissa of which is the shop air pressure and the ordinate is the detection cell pressure in terms of inches of water below atmosphere. Curve A on the graph in FIG. 2 indicates the performance of the jet pump utilized in the apparatus 10 without the restriction 96 on the outlet end of the pump. As will be noted, the vacuum or suction created by the pump and, hence, the flow rate of exhaust gas through the apparatus is almost a linear function of the jet pressure or shop air pressure within the normal operating region of air pressures. If the normal pressure variation in the shop air is between about 10 and 25 p.s.i.g, for example, it is seen by the bracket B that the cell pressure may vary about 2 inches of water. By providing a restriction on the end of the jet pump, it is apparent that the efficiency of the jet pump will decrease and, as a result, the pressure in the cell will likewise decrease as evidenced by the performance curves C and D for systems incorporating restrictions 96 of progressively smaller size. However, it is seen that as the restrictions decrease in size, the performance curves tend to flatten out or become horizontal until a flat performance curve E is achieved evidencing a generally constant cell pressure of 4 inches of water over the expected shop air pressure variation range of 10 to 25 p.s.i.g. Thus while pumping efficiency is sacrificed by the provision of the restriction 96 on the jet pump, the rate of flow of the sample gas through the apparatus is maintained substantially constant within the range of pressure fluctuations normally encountered in the shop air supply. As a consequence, the response time of the analyzer 16 remains relatively constant and there is a minimum of error in the output of the analyzer due to fluctuations in pressure within the detection cell 26.

In a gas analysis system constructed in accordance with the teachings of the present invention, a sampling probe about 20 feet long was connected to a condenser and filter assembly like assembly 15. The inner diameter of the inner tube 64 of the jet pump was about one-sixteenth inch and the inner diameter of the outer tube 60 was about seven-sixteenths inch.

The outlet 66 of the tube 64 was spaced about 3.75 inches from the outlet end 68 of the outer tube and the restriction 96 had a diameter of about 0.2 inch. Thus, if A represents the inner diameter of the inner tube 64, B represents the inner diameter of outer tube 60, C represents the diameter of restriction 96, and D represents the distance between the end 66 of tube 64 and the outlet end 68 of tube 60, the ratio of the dimensions A, B, C and D is approximately 1:7:3.2:60. With the valve assembly 76 connected to a conventional shop air supply, and the valve element 92 set so as to provide air pressure in the line 72 of about 10 to 25 p.s.i.g, it has been found that, in spite of 50 percent variations in the pressure in the shop air supply, the jet pump conveyed the gas sample through the system at a virtually constant rate of about 0.5 cubic feet per minute with the result that the response time of the analyzer was less than 5 seconds, and the maximum error in the output of the analyzer 16 was less than 1 percent. Similar successful results have been achieved by a jet pump wherein the ratio of the dimensions A, B, C and D was approximately 1:7:3.2:4 and the air pressure in line 72 was between about 15 to 30 p.s.i.g. It can be appreciated that the dimensions of the inner and outer tubes of the jet pump and of the restriction 96 and the ratios of such dimensions may be selected at values other than those specified above if the jet pump is utilized in gas analysis apparatuses having different flow and pressure requirements than those disclosed herein or if the pump is utilized for entirely different purposes, yet the simple and automatic pressure regulation feature achieved by the pump will be retained.

While the present invention has been described primarily in connection with the analysis of exhaust gas from automobile exhaust pipes, it is of course understood that the invention may also be utilized for analyzing the exhaust of other motor vehicles, the exhaust of internal combustion engines wherever located, as well as any other hot gases containing water vapor.

Although we have herein shown and described our invention in what we have conceived to be the most practical and preferred embodiments, it is recognized that departures may be made therefrom within the scope of our invention, which is not to be limited to the details disclosed herein but is to be accorded the full scope of the claims so as to embrace any and all equivalent structures and systems.

What I claim is:

1. In an engine exhaust gas analysis apparatus, the combination of:
    engine exhaust gas analysis means including an engine exhaust gas sample cell having inlet and outlet ports;
    conduit means having one end adapted to be placed in flow communication with a source of engine exhaust sample gas, the other end of said conduit means being connected to said inlet port of said cell;
    pump means in communication with said conduit means for conveying gas from said source through said conduit means and said cell;
    air cooled condenser means in said conduit means between said one end thereof and said cell for lowering the temperature of the gas passing through said condenser means to essentially ambient temperature and condense out water vapor in the gas; and
    heating means for raising the temperature of the gas emanating from said condenser means and passing through said conduit means and said cell to above said ambient temperature so that water vapor in the gas emanating from said condenser means will remain in the vapor state and hence will not condense upon the walls of said conduit means or said cell.

2. An engine exhaust gas analysis apparatus as set forth in claim 1 wherein:
    the section of said conduit means adjacent to said one end thereof and upstream of said condenser means is in the form of a flexible metallic tube whereby the gas passing therethrough is precooled prior to reaching said condenser means.

3. An engine exhaust gas analysis apparatus as set forth in claim 1 wherein:
    said pump means is connected to said outlet port for drawing gas from said source through said condenser means and said cell via said conduit means.

4. An engine exhaust gas analysis apparatus as set forth in claim 3 wherein:
    said pump means is driven by a pressurized gas.

5. An engine exhaust gas analysis apparatus as set forth in claim 4 wherein:
    said pump means is a jet pump.

6. An engine exhaust gas analysis apparatus as set forth in claim 3 wherein:
    said condenser means includes a condensate trap; and
    said cell is positioned above said trap a distance sufficiently great so that the suction produced by said pump means is incapable of drawing condensate from said trap through said conduit means into said cell.

7. An engine exhaust gas analysis apparatus as set forth in claim 6 wherein:
    the section of said conduit means adjacent to said one end thereof is in the form of a flexible metallic tube which allows cooling of the gas passing therethrough;
    an intermediate section of said tube is disposed below the remainder thereof when said one end is coupled to said source whereby said intermediate section is capable of collecting condensate therein; and
    said cell is positioned above said intermediate section or said tube a distance sufficiently great so that the suction produced by said pump means is incapable of drawing condensate from said intermediate section through said conduit means into said cell.

8. An engine exhaust gas analysis apparatus as set forth in claim 7 wherein:
    said pump means is a jet pump including first and second tubular members;
    said first member being connected to said outlet port of said cell and terminating in an outlet end;
    said second member having one of its ends extending outside of said first member for connection to a source of fluid pressure and its other end terminating inside said first member, said other end opening in the direction of said outlet end of said first member and spaced upstream thereof.

9. An engine exhaust gas analysis apparatus as set forth in claim 8 including:
    a restriction in said first member adjacent to said outlet end thereof; and
    the relative diameters of said restriction, of said first member and of said other end of said second member being such as to maintain the pressure in said cell substantially constant within the range of pressure fluctuations encountered in the fluid conveyed from said fluid source to said second tube.

10. An engine exhaust gas analysis apparatus as set forth in claim 1 wherein:
    the force produced by said pump means is insufficient to convey any water from any portion of said condenser or said conduit means into said cell.

11. An engine exhaust gas analysis apparatus as set forth in claim 1 wherein:
    said pump means creates a flow rate of gas through said conduit means, condenser means and cell within the range of about 0.2 to 2.0 cubic feet per minute.

12. An engine exhaust gas analysis apparatus as set forth in claim 11 wherein:
    said pump means creates a pressure in said cell within the range of about 3.5 to 4.5 inches of water below atmosphere.

13. An engine exhaust gas analysis apparatus as set forth in claim 6 wherein:
    said pump means creates a flow rate of gas through said conduit means, condenser means and cell within the range of about 0.2 to 2.0 cubic feet per minute.

14. An engine exhaust gas analysis apparatus as set forth in claim 13 wherein:
said pump means creates a pressure in said cell within the range of about 3.5 to 4.5 inches of water below atmosphere.

15. In an engine exhaust gas analysis apparatus, the combination of:
engine exhaust gas analysis means including a gas sample cell having inlet and outlet ports;
conduit means having one end adapted to be placed in flow communication with a source of sample gas, the other end of said conduit means being connected to said inlet port of said cell;
pump means in communication with said conduit means for conveying gas from said source through said conduit means and said cell;
condenser means in said conduit means between said one end thereof and said cell so that water vapor in the gas is condensed out, said condenser means including a condensate trap; and
said cell is positioned above said trap a distance sufficiently great so that the force produced by said pump means is incapable of conveying condensate from said trap through said conduit means into said cell.

16. An engine exhaust gas analysis apparatus as set forth in claim 15 wherein said condenser means is air cooled for lowering the temperature of the gas passing therethrough to essentially ambient temperature and including:
heating means for raising the temperature of the gas emanating from said condenser means and passing through said conduit means and said cell to above said ambient temperature so that water vapor in the gas emanating from said condenser means will remain in the vapor state and hence will not condense upon the walls of said conduit means or said cell.

17. An engine exhaust gas analysis apparatus as set forth in claim 16 wherein:
said pump means is connected to said outlet port for drawing gas from said source through said condenser means and said cell via said conduit means.

18. An engine exhaust gas analysis apparatus as set forth in claim 17 wherein:
said pump means creates a flow rate of gas through said conduit means, condenser means and cell within the range of about 0.2 to 2.0 cubic feet per minute; and
said pump means creates a pressure in said cell within the range of about 3.5 to 4.5 inches of water below atmosphere.

19. An engine exhaust gas analysis apparatus as set forth in claim 17 wherein:
said condenser means is air cooled;
said pump means is connected to said outlet port of said cell; and
said pump means is an air driven pump.

20. In an engine exhaust gas analysis apparatus, the combination of:
engine exhaust gas analysis means including an engine exhaust gas sample cell having inlet and outlet ports;
conduit means having one end adapted to be placed in flow communication with a source of sample gas, the other end of said conduit means being connected to said inlet port of said cell;
a first tube connected to said outlet port of said cell and terminating in an outlet end; and
a second tube of a diameter less than that of said first tube having one of its ends extending outside of said first tube for connection to a source of fluid pressure and its other end terminating inside said first tube, said other end opening in the direction of said outlet end of said first tube and spaced upstream thereof so as to provide a jet pump for drawing sample gas through said conduit means and cell.

21. An engine exhaust gas analysis apparatus as set forth in claim 20 including:
condenser means for condensing out water vapor in said conduit means;
a valve assembly including an inlet fitting adapted to be coupled to a conventional shop air hose, outlet means and a valve element for controlling the flow of air from said inlet fitting to said outlet means;
said one end of said second tube being coupled to said outlet means; and
means coupling said outlet means to said condenser means for supplying cooling air to said condenser means.

22. An engine exhaust analysis apparatus as set forth in claim 21 including:
heating means for raising the temperature of the gas emanating from said condenser means and passing through said conduit means and said cell to above said ambient temperature so that water vapor in the gas emanating from said condenser means will remain in the vapor stage and hence will not condense upon the walls of said conduit means or said cell.

23. An engine exhaust gas analysis apparatus as set forth in claim 20 including:
a restriction in said first tube adjacent to said outlet end thereof; and
relative diameters of said restriction, of said first tube and of said other end of said second tube being such as to maintain the pressure in said detection cell substantially constant within the range of pressure fluctuations encountered in the fluid conveyed from said fluid source to said second tube.

24. An engine exhaust gas analysis apparatus as set forth in claim 20 including:
a valve assembly including an inlet fitting adapted to be coupled to a conventional shop air hose providing said source of fluid pressure, an outlet port and a valve element for regulating the pressure of gas flow through the assembly between the range of about 10 to 30 p.s.i.g.;
said one end of said second tube being coupled to said outlet port of said valve assembly;
a restriction in said first tube adjacent to said outlet end thereof; and
the relative dimensions of said restriction and of said first and second tubes being such as to maintain the pressure in said cell substantially within the limits of ±1 inch of water regardless of fluctuations in air pressure within said 10 to 30 p.s.i.g. pressure range.

25. An engine exhaust gas analysis apparatus as set forth in claim 20 including:
condenser means in said conduit means for condensing out water vapor; and
said one end of said conduit means being in the form of a corrugated metallic tubing which precools the gas passing therethrough prior to reaching said condenser means.

26. In an engine exhaust gas analysis apparatus, the combination of:
engine exhaust gas analysis means including an engine exhaust gas sample cell;
conduit means for conveying engine exhaust sample gas to said cell;
a jet pump connected to said cell for drawing gas through said conduit means and cell, said pump including an inlet adapted to be connected to a source of fluid pressure and an outlet; and
a restriction adjacent to said outlet for maintaining the pressure in said cell substantially constant within the range of pressure fluctuations encountered in the fluid conveyed from said fluid source to said jet pump.

27. A method of analyzing a hot engine exhaust gas containing water vapor comprising the steps of:
air cooling the engine exhaust gas to essentially ambient temperature to condense water vapor therein;
thereafter raising the temperature of the engine exhaust gas to above said ambient temperature while conveying the gas to a sample cell of an engine exhaust gas analyzer so that no water vapor in the gas will condense upon the walls of the cell; and analyzing the gas in said cell.

28. A method as set forth in claim 27 wherein:

said engine exhaust gas is conveyed to said cell through conduit means at a flow rate sufficiently low so that no liquid water collected in the conduit means will be carried by the flowing gas into said cell.

29. A method as set forth in claim 28 wherein:

the flow rate of said gas being conveyed to said cell is within the range of about 0.2 to 2.0 cubic feet per minute.

30. A method as set forth in claim 29 wherein:

the pressure in said cell is maintained within the range of about 3.5 to 4.5 inches of water below atmosphere.

31. A method as set forth in claim 27 wherein:

the pressure in said cell is maintained within the range of about 3.5 to 4.5 inches of water below atmosphere.

32. A method as set forth in claim 27 wherein:

said engine exhaust gas is conveyed through said cell by applying a suction to an outlet port of said cell.

33. A method as set forth in claim 27 wherein said engine exhaust gas is cooled by passing it through a condenser having a water trap; and there being included the additional steps of:

maintaining the pressure in said cell below atmosphere;

and positioning said cell above said trap a number of inches greater than the inches of water below atmosphere of pressure in said cell.

34. A method of analyzing a hot engine exhaust gas containing water vapor comprising the steps of:

air cooling the engine exhaust gas to essentially ambient temperature to condense water vapor therein;

thereafter conveying the gas through a conduit and sample cell of a gas analyzer;

preventing the temperature of said gas, while being conveyed through said conduit and cell, from dropping below said ambient temperature so that water vapor in the gas will not condense upon the walls of said conduit or cell; and analyzing the gas passing through said cell.

35. A method of analyzing a hot engine exhaust gas containing water vapor comprising the steps of:

providing a condenser for condensing out water vapor and having a water trap, an engine exhaust gas analyzer having a sample cell, and conduit means for conveying gas from said condenser through said cell;

conveying the gas through said condenser, conduit means and cell while maintaining the pressure in said cell below atmosphere; and positioning said cell above said water trap a number of inches greater than the inches of water below atmosphere of pressure in said cell while conveying said gas therethrough.

PO-1050
(5/69)

UNITED STATES PATENT OFFICE
CERTIFICATE OF CORRECTION

Patent No. 3,593,023          Dated July 13, 1971

Inventor(s) Michael Dodson and Raymond J. Gomez

It is certified that error appears in the above-identified patent and that said Letters Patent are hereby corrected as shown below:

Column 8, line 28, change "or" to read -- of --

Column 10, line 11, after "exhaust" insert -- gas --

Column 10, line 18, change "stage" to read -- state --

Signed and sealed this 4th day of January 1972.

(SEAL)
Attest:

EDWARD M. FLETCHER, JR.        ROBERT GOTTSCHALK
Attesting Officer              Acting Commissioner of Patents